United States Patent [19]

Castle et al.

[11] Patent Number: 6,109,723
[45] Date of Patent: Aug. 29, 2000

[54] METHOD AND APPARATUS FOR DETERMINING AN OPTIMUM PRINT DENSITY FOR AN INK JET PRINTER

[75] Inventors: Steven T Castle, Philomath, Oreg.; Mark D Lund, Vancouver, Wash.

[73] Assignee: Hewlett-Packard Company, Palo Alto, Calif.

[21] Appl. No.: 09/041,408

[22] Filed: Mar. 12, 1998

[51] Int. Cl.[7] .................................................. B41J 29/393
[52] U.S. Cl. ................................................. 347/19; 347/86
[58] Field of Search ................................... 347/7, 19, 17, 347/15, 102, 86, 87; 399/12, 13, 94, 97

[56] References Cited

U.S. PATENT DOCUMENTS

| | | | |
|---|---|---|---|
| 4,728,963 | 3/1988 | Rasmussen et al. | 347/102 |
| 4,933,684 | 6/1990 | Tasaki et al. | 347/17 |
| 5,049,898 | 9/1991 | Arthur et al. | 347/19 |
| 5,387,976 | 2/1995 | Lesniak | 347/19 X |
| 5,673,069 | 9/1997 | Canfield et al. | 347/17 X |
| 5,699,091 | 12/1997 | Bullock et al. | 347/19 |
| 5,847,724 | 12/1998 | Mantell | 347/15 |
| 5,929,875 | 7/1999 | Su et al. | 347/19 |

*Primary Examiner*—Arthur T. Grimley
*Assistant Examiner*—Hoan Tran
*Attorney, Agent, or Firm*—Teri G. Andrews; Curtis G. Rose

[57] ABSTRACT

A method and apparatus for determining an optimum print density for an ink jet printer uses characteristics of a printer and its peripheral components such as an ink jet printhead, and an ink supply unit to reach an optimum print density. The ink jet printer receives a print command from a computer. The printer reads an ink drop volume parameter from a printhead memory device on the ink jet printhead and stores this parameter in a printer memory device on the ink jet printer. The processor in the printer determines an ink density compensation value for the ink jet printhead based on the ink drop volume parameter. The processor on the ink jet printer applies the ink density compensation value to the print command, thereby creating a depleted print command. Finally, the depleted print command is printed.

15 Claims, 5 Drawing Sheets

METHOD AND APPARATUS FOR DETERMINING AN OPTIMUM PRINT DENSITY FOR AN INK JET PRINTER

FIELD OF THE INVENTION

This invention relates to printers and, more particularly, to a method and apparatus for determining an optimum print density for an ink jet printer.

BACKGROUND OF THE INVENTION

Thermal ink jet printers have experienced great commercial success since they were invented back in the early 1980's. To accommodate the users of today, it has become very important for these ink jet printers to go faster and faster with each new generation. The same users also want improved print quality at these faster speeds. The dots used to construct ink jet characters have gotten progressively smaller to meet the print quality demands. Naturally, as the dots get smaller, more dots are required to construct each character. Although manufacturing of these printheads have progressed as well, it is very difficult to get the exact same size dot to come out of every printhead. The range of acceptable dot sizes is quite narrow; however, a printhead that generates dots on the large side of that range will create characters that their composition of larger dots has overlapped to the point that the media it is printed on becomes wetter and the edges of the characters or images become less defined.

The wet media problem is only compounded by the faster speeds of the newer ink jet printers. The ink jet printing industry has been very successful at maximizing the speed of the ink jet printers while improving the print quality. The problem associated with increasing the speed has been ink dry time. At higher speeds, the ink on one page is not fully dry before another page is printed and dropped on top of it in the output tray of the printer. This results in smearing or blotting between pages. The easiest solution to this problem was to slow down the printers that engineers had worked so hard to speed up and add in a hold time to allow each page sufficient dry time before the next sheet was printed and dropped on top of it. This decreased the throughput of the printer. This was not an acceptable solution to consumers.

A better solution to the problem was to add in a one-sheet hold buffer. This was accomplished by sliding the page onto a set of output rails, or wings, that suspends the sheet above the output tray as it was being printed, allowing the previously printed sheet in the tray below to dry. When the printing of a page was completed, the output rails would drop the sheet onto the now dry sheet below. This is the method used today in ink jet printers.

Now the newest printers on the market have gotten so fast that they have outran the ability to consistently get the sheet dry by using the one-sheet hold buffer method. Consumers continue to want faster printers at an even higher performance. In order to avoid returning to the point of compromising speed to eliminate smearing or blotting between pages, future ink jet printers must develop yet another solution.

SUMMARY OF THE INVENTION

A method and apparatus for determining an optimum print density for an ink jet printer uses characteristics of a printer and its peripheral components such as an ink jet printhead, and an ink supply unit to reach an optimum print density.

The ink jet printer receives a print command from a computer. The printer reads an ink drop volume parameter from a printhead memory device on the ink jet printhead and stores this parameter in a printer memory device on the ink jet printer. The processor in the printer determines an ink density compensation value for the ink jet printhead based on the ink drop volume parameter.

The processor on the ink jet printer applies the ink density compensation value to the print command, thereby creating a depleted print command. Finally, the depleted print command is printed.

DETAILED DESCRIPTION OF THE PREFERRED EMBODIMENT

Figure 1:
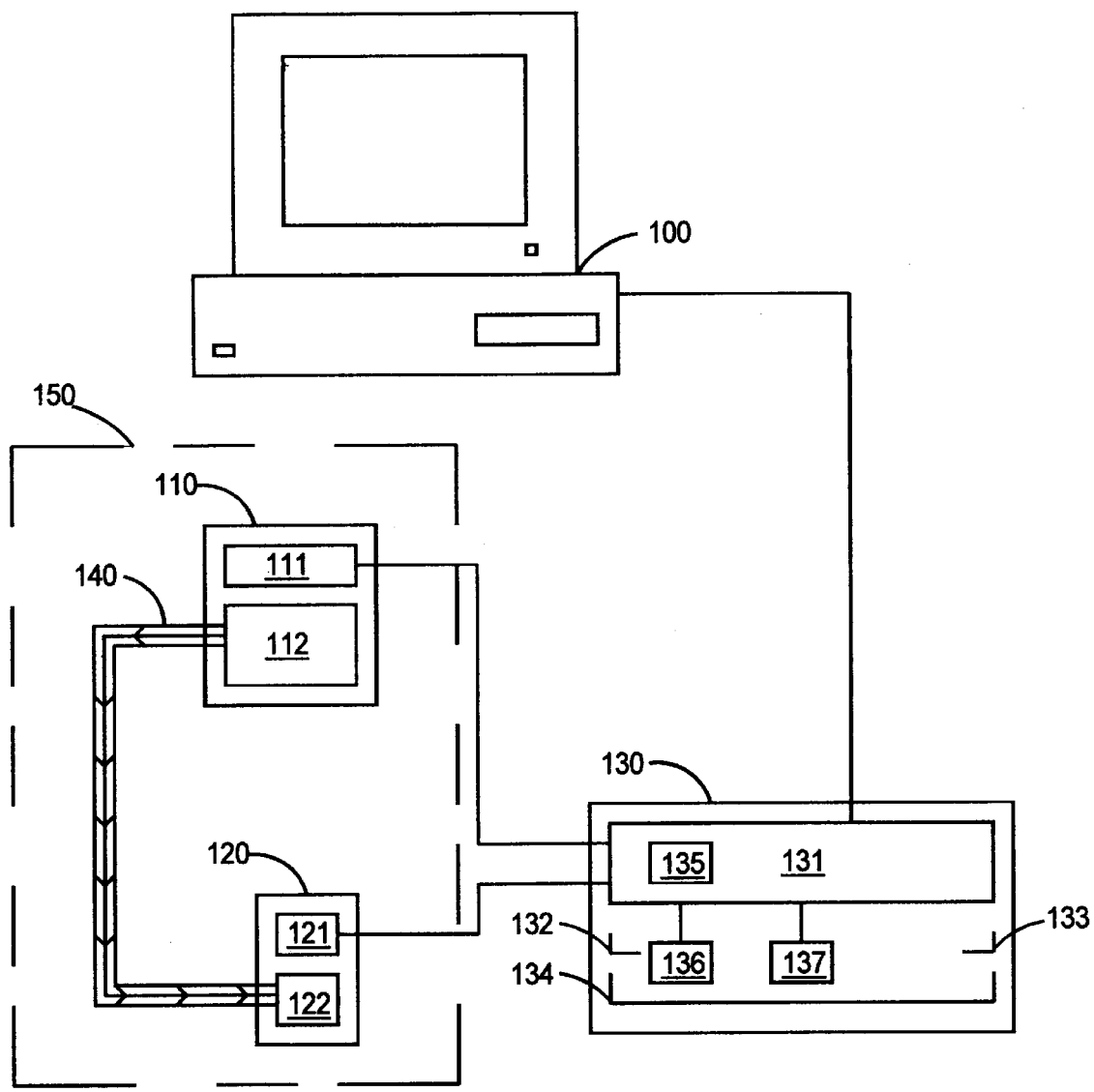
FIG. 1 is a computer controlled ink jet printing system in the preferred embodiment of the invention.

FIG. 1 shows a computer 100 connected to ink jet printer 130. Ink jet printer 130 has a printer memory device 135 which is capable of storing characteristics from peripheral devices such as ink supply cartridge 110 and ink jet printhead 120 of inkjet print cartridge 150. Ink jet printer 130 also has a processor 131 which is capable of reading and manipulating data stored on printer memory device 135 in order to maximize performance of ink jet printer 130.

Ink supply cartridge 110 has data in ink supply memory device 111 based on characteristics of the ink that is contained in ink reservoir 112. In the preferred embodiment, when ink supply cartridge 110 is inserted into ink jet printer 130, the data stored in ink supply memory device 111 is loaded into printer memory device 135. Likewise, the data stored in printhead memory device 121 of ink jet printhead 120 is loaded into printer memory device 135 upon insertion of ink jet printhead 120 into ink jet printer 130. The data stored in printhead memory device 121 is based primarily on the characteristics of printing element 122. Ink reservoir 112 is connected to printing element 122 by a tube creating ink flow path 140.

In an alternate embodiment, ink supply cartridge 110 and ink jet printhead 120 would be integrated into one unit in ink jet print cartridge 150, and would use only one memory device to store all data and characteristics of the printhead and the ink supply. Another alternate embodiment has been contemplated where multiple ink supplies supply one printhead.

In the preferred embodiment, ink supply characteristics stored in ink supply memory device 111 are used with ink jet printhead characteristics stored in printhead memory device 121 to select an appropriate ink density compensation value for subsequent character printing. Examples of ink supply characteristics stored in ink supply memory device 111 are ink formulation parameters associated with the ink in ink reservoir 112 such as viscosity and optical density. The higher the viscosity and optical density, the longer the ink will take to dry when printed. An example of a characteristic of printing element 122 that is loaded into the printhead memory device 121 is ink drop volume. Ink drop volume is a measurement of the volume of one droplet of ink. This measurement is taken at the final stage of the manufacturing process of the ink jet printhead by expelling a droplet of ink into a measurement device. A high drop volume printhead will create larger drops on the page than a low drop volume printhead. When many drops are combined to form a character or image, a high drop volume printhead will make a "wet" character or image that takes more time to dry and also gives degraded print quality.

Ink jet printer 130 also has inherent characteristics that can be incorporated into the performance calculations, such as ambient temperature of ink jet printer 130. This temperature value is measured by ambient temperature sensor 136 located within ink jet printer 130. This value is stored in printer memory device 135. The lower the ambient temperature, the longer the ink will take to dry when printed. Another inherent characteristic of ink jet printer 130 is humidity. The higher the humidity, the longer the ink will take to dry when printed. In the preferred embodiment, the humidity within ink jet printer 130 is measured by humidity sensor 137. The combination of ink characteristics, printing element characteristics and inherent printer characteristics determine the appropriate ink density compensation value and required dry time for optimum printing with a particular combination of ink, printhead and printer. While these parameters can be given equal weight in making this determination, ink drop volume and temperature are preferably given more weight than the other parameters in making the determination. In any event, the following equations are preferably used in making this determination:

Ink Density Compensation=Y[(A)(Ink Drop Volume)+(B)(Ink Viscosity)+(C)(Ink Color Density)+(D)(Printer Temp)+(E)(Printer Humidity)]  [1]

Ink Dry Time=Z[(J)(Ink Drop Volume)+(K)(Ink Viscosity)+(L)(Ink Color Density)+(M)(Printer Temp)+(N)(Printer Humidity)]  [2]

Where A, B, C . . . N, are weighting constants (which in some embodiments are 0), and Y and Z are normalizing constants. Those skilled in the art will appreciate that other equations could be used and fall within the spirit and scope of the invention.

Several alternate embodiments have been contemplated where various subsets of one or more of the above mentioned characteristics determine the appropriate ink density compensation value and required dry time. For example, one alternate embodiment uses only the ink drop volume to determine the ink density compensation value. Another alternate embodiment uses only the ambient printer temperature characteristic to determine the required dry time. Those skilled in the art will appreciate that a multitude of different subsets of these characteristics can be used and fall within the spirit and scope of the invention.

The combination of left hold wing 132 and right hold wing 133 form a media holding mechanism on ink jet printer 130, creating a shelf for the page to rest on during printing. Those skilled in the art will appreciate devices other than wings could be used for the holding mechanism. The holding mechanism allows the previously printed sheet that is in paper tray 134 to dry. At the completion of the printing, left hold wing 132 and right hold wing 133 drop out of the way and the sheet falls to the paper tray 134. Finally, left hold wing 132 and right hold wing 133 go back to their shelf position and the next page commences printing. The time spent by the page in the shelf created by left hold wing 132 and right hold wing 133 is called "wing hold time." Current high speed ink jet technology requires the wing hold time to be increased for all printheads to accommodate high drop volume printheads, to avoid page to page blotting or smearing caused by wet ink. This "least common denominator" approach unnecessarily slows down low and medium drop volume printheads.

Figure 2A:
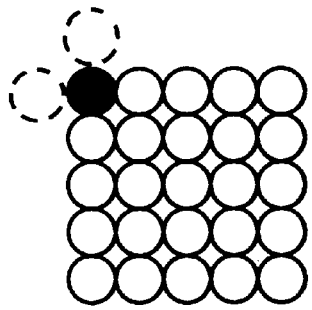
FIG. 2A through FIG. 2E illustrate exemplary variations of ink density compensation percentages applied to ink jet printing from four percent in FIG. 2A to twenty percent in FIG. 2E.
Figure 2B:
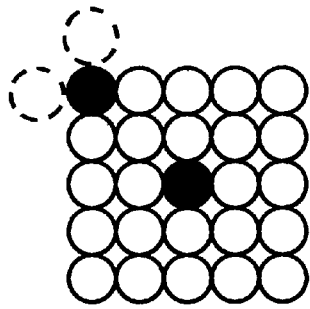
Figure 2C:
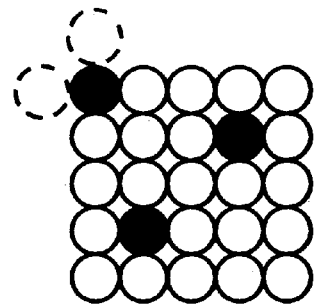
Figure 2D:
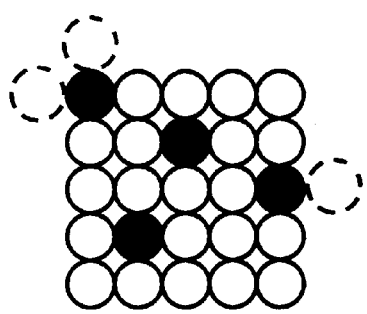
Figure 2E:
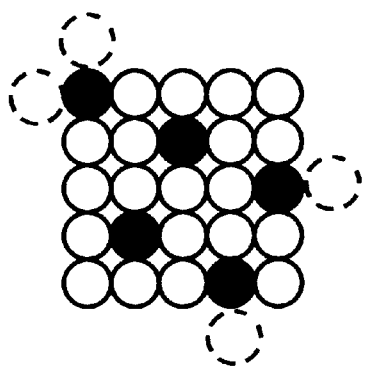

FIG. 2A through FIG. 2E illustrates exemplary variations of ink density compensation percentages applied to ink jet printing. Formation of characters in ink jet printing is based on a matrix of very small dots. For clarity FIG. 2A through FIG. 2E use a five dot by five dot square matrix for illustrative purposes. This five by five matrix would typically form a portion of one character. The blackened dots depict the dots to be depleted or "turned off." The "dashed" dots are dots that would have to be present in the character or image for the blackened dot to be qualified for depletion. FIG. 2A shows a four percent depletion with one out of twenty-five dots being depleted. FIG. 2B shows an eight percent depletion. FIG. 2C shows a twelve percent depletion. FIG. 2D shows a sixteen percent depletion. FIG. 2E shows a twenty percent depletion with five out of twenty-five dots being depleted. The highest drop volume printheads will apply the highest depletion value. Those skilled in the art would appreciate that a variety of depletion percentage possibilities could be used.

Figure 3:
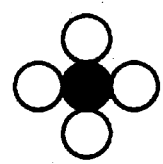
FIG. 3 is a representation of an exemplary subtractive Ink Density Compensation rule used in the preferred embodiment of the invention.

FIG. 3 is an illustration of an exemplary subtractive ink density compensation rule. In this rule, the center blackened dot can only be depleted if the surrounding four dots are commanded to be printed. With a sufficiently high drop volume printhead, the four dots will coalesce and fill in the space made by the depleted dot. Without this rule, depletion could cause visually obvious voids in cases where there were not four surrounding dots to cover for it. Moreover, this rule preferably does not allow subtractive compensation in the outside row of dots, as there preferably would be a dot on both sides of a dot to be depleted. As a result of this ink density compensation rule depicted in FIG. 3, borders and edges maintain the desired sharpness and intensity.

Figure 4:
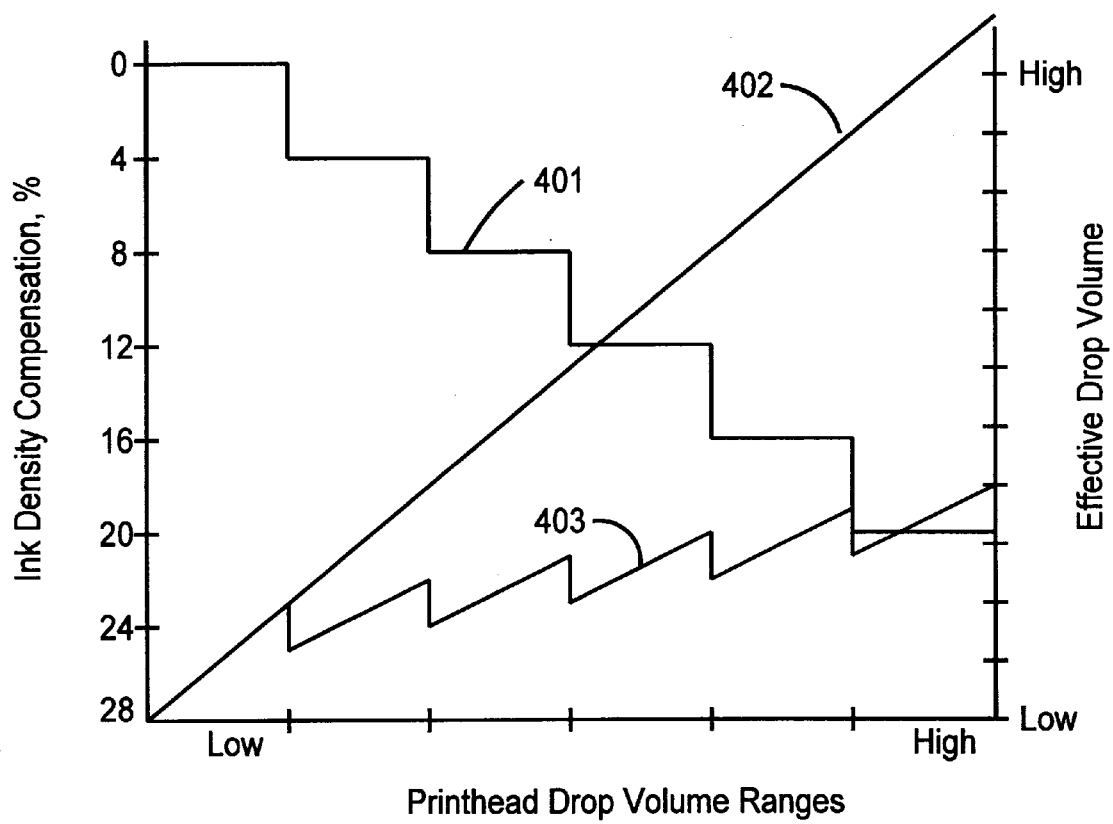
FIG. 4 is a graph of Ink Density Compensation Percentage and Effective Drop Volume versus Printhead Drop Volume Ranges while printing in Normal mode.

FIG. 4 is a graph of Ink Density Compensation Percentage and Effective Drop Volume versus Printhead Drop Volume Ranges while printing in "normal" print mode. For ease of explanation in this preferred embodiment of the invention, the ink density compensation percentage is represented in a subtractive mode, thereby compensating for high drop volume printheads by depleting selected drops of ink. However, in an alternate embodiment, a similar method has been contemplated to compensate for low drop volume printheads by using an additive method that would apply additional drops of ink.

Line 401 is the percentage of ink density compensation applied at the respective printhead drop volume ranges. These ranges go from "low" on the left to "high" on the right. In the preferred embodiment, the manufacturing process should discard any printhead with a drop volume below the low value or above the high value. Drop volumes outside the limits will be treated as being at the limits. Line 403 shows the effective drop volume realized upon application of the ink density compensation. Note that the effective drop volume stays relatively constant over a wide range of printhead drop volume ranges due to the ink density compensation effect. Line 402 corresponds to the effective drop volume of the same printhead without the ink density compensation. Without ink density compensation, as the printhead drop volume increases, the effective drop weight also increases thereby creating a "wet" output.

The formation of characters in an ink jet printer is based on a multitude of dots that touch one another to give a solid appearance to the characters. With higher drop volume printheads, the dots begin to overlap thereby putting excessive ink on the page. As shown in FIG. 4, as the drop volume increases the percentage of subtractive ink density compensation is also increased. Therefore, as shown by line 403, the ink density compensation method is capable of maintaining a relatively constant level of effective drop volume or "wetness" without sacrificing print quality.

Currently, a high drop volume printhead leaves a very wet page and requires additional wing hold time to dry. In the preferred embodiment of the invention, the subtractive ink density compensation applied to the ink jet printing system accommodates for high drop volume printheads and compensates accordingly, creating a relatively consistent level of effective drop volume in each page. With a known wetness, the wing hold time necessary to dry the ink can be minimized and the speed of the printer will therefore be optimized.

Figure 5:
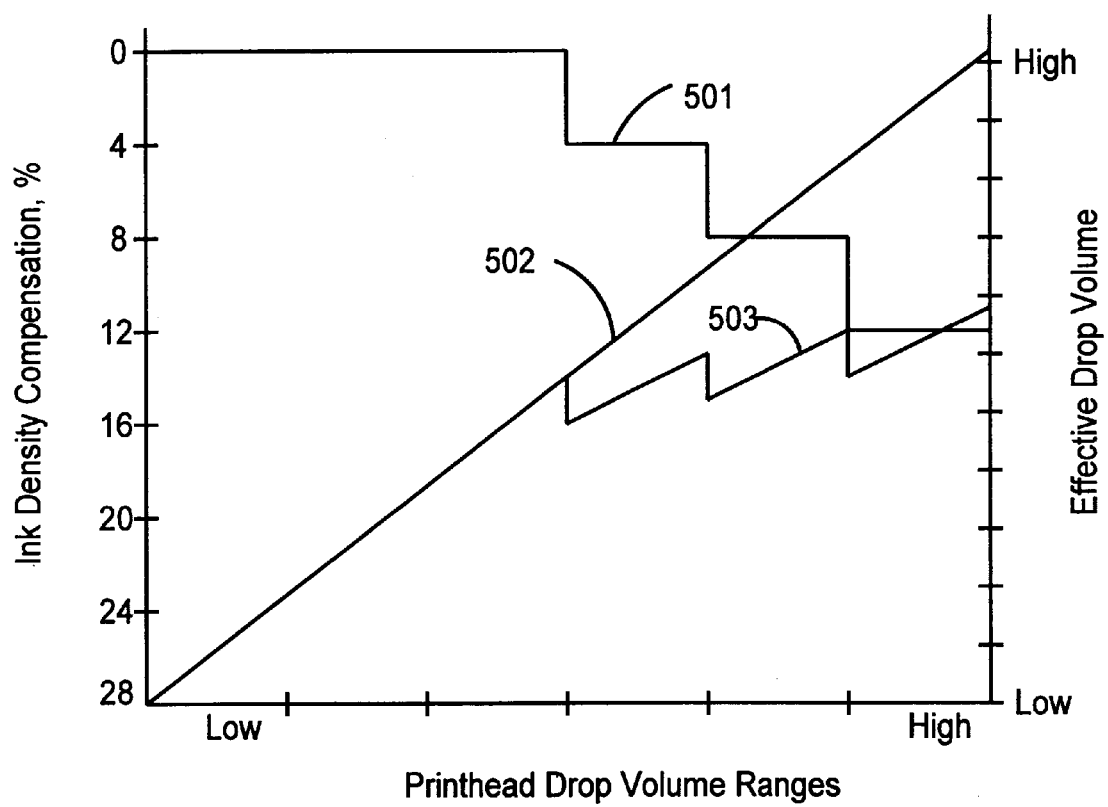
FIG. 5 is a graph of Ink Density Compensation Percentage and Effective Drop Volume versus Printhead Drop Volume Ranges while printing in High Quality mode.

FIG. 5 is a graph of Ink Density Compensation Percentage and Effective Drop Volume versus Printhead Drop Volume Ranges when printing in "high quality" print mode. Similar to FIG. 4, line 501 represents the ink density compensation percentage applied to the characters or images based on the printhead drop volume. Line 503 represents the effective drop volume realized by the applied compensation of line 501. And, line 503 represents the effective drop volume in the absence of compensation. When printing in high quality print mode, users are expecting a darker, more densely printed output. In this mode, the ink density compensation is not applied to lower drop volume printheads. Only mid-range to high drop volume printheads are compensated, thereby the effective drop volume is increased giving the desired darker, more densely printed output.

Another embodiment of the invention includes the ability to vary the ink density compensation based on media. Currently, ink jet printers use a high quality print mode for printing transparencies and would be compensated accordingly. Other ink density compensation has been contemplated for varying qualities of media either detected by the system or manually entered by the user.

Figure 6:
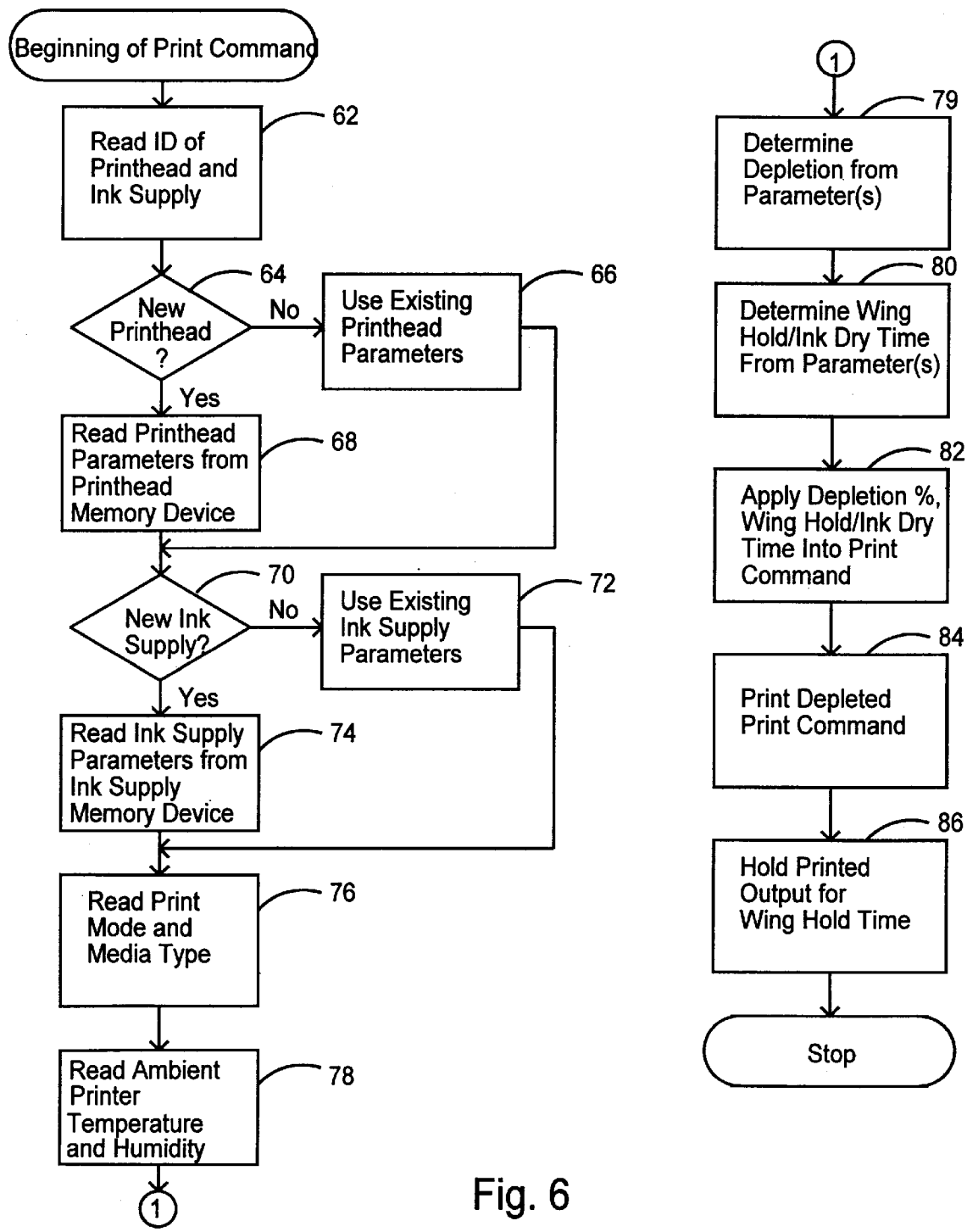
FIG. 6 is a representation of the flowchart of the preferred embodiment of the present invention for determining an appropriate ink density compensation percentage and necessary ink dry time.

FIG. 6 represents detail of the flowchart for determining ink density compensation percentage and wing hold time in the preferred embodiment of the invention. The flowchart of FIG. 6 is preferably executed by suitably programmed processor 131 of FIG. 1, although alternate embodiments have been contemplated where the flowchart of FIG. 6 describes the operation of special purpose hardware or through other means.

The process begins at the beginning of a print command. A print command is an order initiated by computer 100 and sent to processor 131 of ink jet printer 130 (FIG. 1) for printing of one or more pages of text or images. By reading the printhead memory device 121 of FIG. 1 in block 62, the identification of ink jet printhead 120 is determined. The ink memory device 111 of ink supply cartridge 110 of FIG. 1 is also read at this time. A comparison is made in block 64 with the existing printhead identification in ink jet printer 130 of FIG. 1. If the identifications match, then this is not a new printhead, and flow of control moves to block 66 which continues to use the existing printhead parameters in processor 131 of ink jet printer 130. If the identifications do not match, this is a new printhead and the printhead parameters, such as ink drop volume, are read from printhead memory device 121 of FIG. 1 in block 68 and stored in printer memory device 135 of ink jet printer 130 for use by processor 131.

In block 70, the identification of ink supply cartridge 110 of FIG. 1 is read from ink supply memory device 111 in block 62 and is compared with the identification currently stored in printer memory device 135 of ink jet printer 130. Processor 131 determines if this is a new ink supply cartridge. If the identifications match, it is not a new ink supply cartridge and processor 131 is instructed to use the existing ink parameters in block 72. If the identifications are dissimilar, it is a new ink supply cartridge. Block 74 reads all ink formulation parameters, such as viscosity and color density, from ink memory device 112 of ink supply cartridge 110 and stores the information in printer memory device 135 for use by processor 131.

In block 76, the print mode and media type is read from printer memory 135. As previously discussed, these parameters are either determined by the printer or entered by the user.

In block 78, processor 131 of ink jet printer 130, reads internal ambient temperature sensor 136 and humidity sensor 137 located in the ink jet printer 130 (FIG. 1). This temperature and humidity reading is used in block 80 with the ink parameters collected in blocks 74 and 76 to determine the wing hold time. The wing hold time is used to determine the optimum ink dry time required for the sheet to remain in the winged shelf, created by left hold wing 132 and right hold wing 133, prior to dropping into paper tray 134 (FIG. 1) in order for the ink to be sufficiently dry. Preferably, the sheet has been given ample wing hold time to avoid the page to page blotting and smearing that will occur in the paper tray 134 if the ink is still wet.

In block 79, processor 131 of ink jet printer 130 (FIG. 1) determines the appropriate ink compensation percentage to apply to the print command based on one or more of the characteristics of ink supply cartridge 110 and its ink contained in ink reservoir 112, the characteristics of ink jet printhead 120 and its printing element 122, and the inherent printer characteristics of ink jet printer 130. As noted previously, the higher the drop volume of the printhead, the higher the subtractive ink density compensation percentage will be.

A composite ink jet printhead cartridge has been contemplated where the printhead and ink supply cartridge is one unit. In this alternate embodiment, there would be only one memory device to read for the entire unit that would supply both ink supply data as well as printhead data. In this embodiment, blocks 62–68 would be incorporated into blocks 70–74.

Block 82 applies the newly calculated parameters for depletion percentage and wing hold time to the print command, thereby creating a depleted print command. The depleted print command is then printed by ink jet printer 130 in block 84. Block 86 holds each page of printed output in left hold wing 132 and right hold wing 133 of ink jet printer 130 for the optimum ink dry time determined in block 80 for the previous page of output.

The use of ink density compensation assures that there will be a near constant level of "wetness" on the page for a specific combination of ink jet printhead and ink supply cartridge. The ability to maintain a near constant level of ink wetness on the page, coupled with the ability to read other parameters such as the ambient temperature and the humidity, allows a wing hold time for this same combination to be determined and implemented. Moreover, when the combination of devices change by one or more elements, the ink density compensation and respective wing hold time are again determined to ensure maximum quality and speed based on the components installed.

What is claimed is:

1. An ink jet printing system, comprising:
   an ink jet printer having a processor capable of receiving print commands from a computer;

an ink jet printhead electrically connected to said ink jet printer, said ink jet printhead having a printhead memory device for storing printhead data and for transmitting said printhead data to said processor of said ink jet printer;

an ink supply cartridge electrically connected to said ink jet printer, said ink supply cartridge having an ink supply cartridge memory device for storing supply cartridge data and for transmitting said supply cartridge data to said processor of said ink jet printer; and wherein said processor adaptively determines an optimum print density for printing operations using said printhead and said supply cartridge in dependence on said ink supply data and said printhead data.

2. The ink jet printing system of claim 1, wherein the printhead data from said printhead memory device is an ink drop volume parameter, and wherein the supply cartridge data from said ink supply cartridge memory device is an ink formulation parameter.

3. The ink jet printing system of claim 2, wherein said processor determines an optimum ink dry time in dependence on temperature data from a temperature sensor in said ink jet printer.

4. The ink jet printing system of claim 3, wherein said processor uses humidity data from humidity sensor in said ink jet printer in said determining of said optimum ink dry time.

5. The ink jet printing system of claim 4, wherein said ink jet printer further comprises:

a left output holding wing and a right output holding wing, said left output holding wing and said right output holding wing together for holding a finished printed page during printing; and an output tray located below said left output holding wing and said right output holding wing, wherein said finished printed page drops from said left output holding wing and said right output holding wing after said optimum ink drying time onto said output tray.

6. An ink jet printing system, comprising:

an ink jet printer responsive to print commands from a computer;

an ink jet printhead electrically connected to said ink jet printer, said ink jet printhead transmitting an ink drop volume parameter to said ink jet printer;

said ink jet printer applying said ink drop volume parameter to said print commands to achieve an optimum print density;

a mechanism for holding a first printed page of output to provide separation from a second printed page of output, wherein said second printed page of output is printed subsequently to said first printed page of output; and a temperature sensor in said ink jet printer for measuring temperature data, said temperature data used by said ink jet printer to hold said first printed page of output in said holding mechanism an optimal period of time for said second printed page of output to dry.

7. The ink jet printing system of claim 6, further comprising:

an ink supply cartridge electrically connected to said ink jet printer, said ink jet supply cartridge transmitting an ink formulation parameter to said ink jet printer; and said ink jet printer applying said ink formulation parameter to said print commands to achieve an optimum print density.

8. The ink jet printing system of claim 7, further comprising:

a humidity sensor in said ink jet printer for measuring humidity data, said humidity data used by said ink jet printer to hold said first printed page of output in said holding mechanism an optimal period of time for said second printed page of output to dry.

9. The ink jet printing system of claim 8, wherein said ink drop volume parameter is used in conjunction with said temperature data and said humidity data to determine said optimal period of time for said second printed page of output to dry.

10. An ink jet printing system, comprising:

a computer;

an ink jet printer having a processor responsive to instructions from said computer;

an ink jet printhead electrically connected to said ink jet printer, said ink jet printhead having an attached printhead memory device for storing printhead data and for transmitting said printhead data to said processor of said ink jet printer; and an ink supply cartridge electrically connected to said ink jet printer, said ink supply cartridge having an ink supply cartridge having an ink supply cartridge memory device for storing supply cartridge data and for transmitting said supply cartridge data to said processor of said ink jet printer; and wherein said processor determines a print density for printing operations to be conducted with said ink jet printhead and said ink supply cartridge in dependence on said ink supply data and said printhead data.

11. A method of determining an optimum print density for an ink jet printhead used in an ink jet printer, said method comprising the steps of:

receiving a print command in said ink jet printer from a computer;

reading an ink drop volume parameter from a printhead memory device on said ink jet printhead into a printer memory device on said ink jet printer;

said ink jet printer reading an ink formulation parameter from an ink memory device on an ink supply cartridge into a printer memory device on said ink jet printer;

determining an ink density compensation value for said ink jet printhead based on said ink drop volume parameter and on said ink formulation parameter;

applying said ink density compensation value to the print command, thereby creating a depleted print command; and using said ink jet printhead, said ink jet printer and said depleted print command in a printing operation.

12. The method of claim 11, wherein said ink formulation parameter is ink viscosity.

13. The method of claim 12, further comprising the steps of:

measuring an ambient temperature of said ink jet printer;

calculating an optimum ink dry time based on said ambient temperature; and holding each page of printed output for said print command for said optimum ink dry time of the previous page of printed output for said print command.

14. The method of claim 13, further comprising the steps of:

measuring a humidity value of said ink jet printer; and calculating said optimum ink dry time in said processor in said ink jet printer using said humidity value, said ambient temperature and said ink formulation parameter.

15. The method of claim 11, wherein said ink formulation parameter is ink optical density.

* * * * *